June 3, 1930.  J. H. BOLLES ET AL  1,762,116
TRANSMISSION LOCK
Filed April 2, 1928
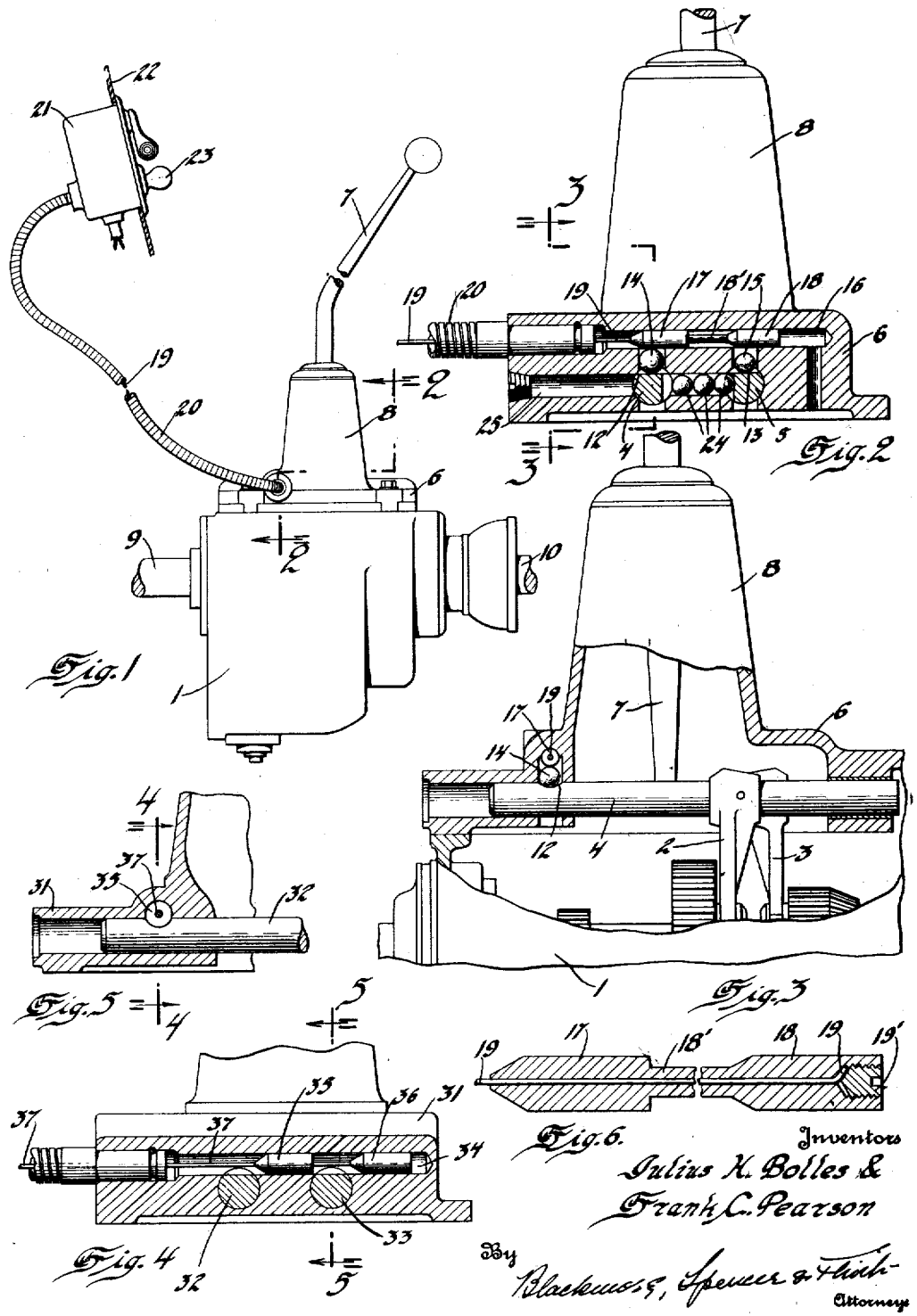

Patented June 3, 1930

1,762,116

UNITED STATES PATENT OFFICE

JULIUS H. BOLLES, OF DETROIT, AND FRANK C. PEARSON, OF LANSING, MICHIGAN, ASSIGNORS TO GENERAL MOTORS CORPORATION, OF DETROIT, MICHIGAN, A CORPORATION OF DELAWARE

TRANSMISSION LOCK

Application filed April 2, 1928. Serial No. 266,650.

This invention relates to anti-theft devices and more particularly to an arrangement for locking gear-shifting mechanism, such as commonly employed on motor vehicles, against unauthorized manipulation.

One of the objects of the invention is to provide an improved transmission lock that will be simple in design, economical in manufacture, convenient and easy to control, and tamper-proof in use.

It is a further object of the invention to provide a lock for gear-shifting mechanisms that is automatically operated, coincidentally with the proper manipulation of a key-controlled switch governing the ignition system for an internal combustion engine.

Other objects and advantages will be apparent from the following specification taken in connection with the accompanying drawings, in which—

Fig. 1 is a side elevation of a transmission unit and ignition switch arranged in accordance with the present invention.

Fig. 2 is a sectional view taken on line 2—2 of Fig. 1.

Fig. 3 is a sectional view taken on line 3—3 of Fig. 2.

Fig. 4 is a sectional view taken on line 4—4 of Fig. 5, showing a modification.

Fig. 5 is a section on line 5—5 of Fig. 4.

Fig. 6 is an enlarged sectional view showing in detail the assembly of a bolting element and its actuating wire or cable.

Referring to the drawings by reference characters, the numeral 1 indicates a housing or casing for a selective sliding gear transmission, the gears of which are controlled by shifter forks 2 and 3 fixedly carried on a pair of sliding rods or shafts 4 and 5 mounted in spaced parallel relation in the transmission cover 6. A manually operated shift lever 7, mounted for universal movement in the pedestal or dome 8 of the cover 6, is adapted upon proper manipulation to move either of the rods 4—5 to shift the transmission gearing and couple the driving shaft 9 and driven shaft 10 in certain speed ratios. In the neutral or inoperative position of the gear shifter rods 4 and 5 semispherical grooves or depressions 12 and 13, respectively, formed in their upper surfaces are in alignment with each other, and into these depressions extend a pair of spherical pawl elements or balls 14 and 15, which are adapted to move up and out of the grooves and ride on the top surfaces of the rods when the rods are shifted to and fro. In the upper portion of the transmission cover 6 is located a circular opening or bore 16 extending transversely or at right angles to the shifter rods, and in which is slidable a bolt element comprising a pair of integral plungers 17 and 18 joined by a neck portion 18' of reduced diameter and through which extends a flexible wire or cable 19 fixedly secured thereto by a plug 19' screw-threaded in the enlarged opening at the end of the bolt element and having a tapered or conical end portion which cooperates with a similarly shaped shoulder in the opening through the bolt to firmly clamp the bent over end of the wire. The wire 19 leads through a flexible hose 20 to a distantly located casing 21 preferably mounted on the instrument panel 22 and which encloses the customary switch of the engine ignition system. A key 23, within easy reach of the driver, controls a lock housed within the casing 21, which when opened closes the ignition circuit and pushes on the wire 19 to slide both plungers 17 and 18 to a position where no interference will be offered to the rise of the pawl elements 14 and 15 upward into the bore 16, and when the mechanism is locked by the key, the ignition switch is opened and the plungers 17 and 18 are moved directly over the balls 14 and 15, as shown in Fig. 2, and hold such balls in the grooves 12 and 13, thereby locking the rods in neutral position.

In order to hold one of the rods against accidental movement when the other is moved from its inoperative position, there is provided an interlock comprising a series of balls 24 located within a circular bore or opening 25 in the cover plate 6, and between the spaced rods. These balls are adapted to be shifted sidewise in the opening 25 and to extend within semi-spherical notches or grooves in the sides of the shifter rods, the combined width of the several balls being equal to the distance between the shifter rods, plus the depth of one notch, whereby when one of the rods is moved the balls will be shifted toward the other rod, one of the endmost balls riding on the surface of the shifted rod and the ball at the other end of the series extending into the groove to lock the rod against movement.

In the modified construction illustrated in Fig. 4, the transmission cover 31 carries a pair of shifter rods 32 and 33, and slidable in an opening 34 therein are a pair of plunger elements 35 and 36 fixed on the wire 37, which plunger elements have locking engagement directly within grooves in the top surfaces of the shifter rods when the same are in the neutral position.

In this instance the plunger elements are separately formed and independently secured on the flexible operating wire as distinguished from the integral type heretofore referred to, and the several ball elements employed with the construction previously described have been omitted.

It is to be understood that the invention is not limited to the exact details shown, but that such modifications may be made as come within the scope of the appended claims.

Having thus described our invention, we claim:

1. In combination, a pair of independently slidable work performing members arranged in parallel relation in the same horizontal plane and having depressions in their upper surfaces which are brought into alignment when both members are in inoperative position, a pair of gravity controlled pawl elements adapted to ride on said surfaces during movement of the members and to drop into the depressions when the members are in the inoperative positions, and a pair of reciprocable plungers movable in a horizontal plane to and from a position in which they hold the pawl elements from raising out of said depressions thereby locking said members against sliding movement.

2. In combination, a plurality of shifter rods arranged in parallel relation in the same horizontal plane and a series of plungers, one for each rod, grouped and fixed with one another in successive alined relation for unison movement transversely of said rods in a horizontal plane spaced from that of the rods, to lock all the rods against movement.

3. In combination, a horizontally movable shaft having a depression in its upper surface, a gravity controlled pawl adapted to ride on the upper surface of the shaft during shaft movement and to drop into said depression at a predetermined point in the range of shaft movement, and a horizontally shiftable device movable to overlie the pawl when in the depression to engage and hold the pawl in the depression, thereby locking the shaft against movement.

4. In combination, a transmission housing having a plurality of spaced longitudinally extending parallel openings therein, arranged in the same horizontal plane, and a single transversely extending horizontal opening spaced above the plane of the longitudinal openings, and vertical passageways between said longitudinal openings and the transverse opening, a shifter rod in each longitudinal opening having a depression in its upper surface, a pawl in each vertical passage adapted by its weight to ride on the upper surface of the adjacent shifter rod with its top portion extending into the transverse opening when the pawl is out of the depression, and a plunger in the transverse opening movable over the series of pawls when all are in the depressions to preclude their rising out of the depressions, and thereby lock the rods against shifting movement.

In testimony whereof we affix our signatures.

JULIUS H. BOLLES.
FRANK C. PEARSON.